United States Patent
Wallace et al.

(12)

(10) Patent No.: US 6,787,220 B2
(45) Date of Patent: Sep. 7, 2004

(54) MULTILAYER HEAT SHRINKABLE FILM

(75) Inventors: Rodney L. Wallace, Centerville, IA (US); Stamatis Ginossatis, Koropi (GR)

(73) Assignee: Vector Europe NV, Hasselt (BE)

( * ) Notice: Subject to any disclaimer, the term of this patent is extended or adjusted under 35 U.S.C. 154(b) by 54 days.

(21) Appl. No.: 10/149,832

(22) PCT Filed: Dec. 15, 2000

(86) PCT No.: PCT/AU00/01545

§ 371 (c)(1),
(2), (4) Date: Nov. 5, 2002

(87) PCT Pub. No.: WO01/43962

PCT Pub. Date: Jun. 21, 2001

(65) Prior Publication Data

US 2003/0157355 A1 Aug. 21, 2003

(30) Foreign Application Priority Data

Dec. 15, 1999 (AU) ............................................. PQ 4665

(51) Int. Cl.$^7$ ............................................... B32B 27/32
(52) U.S. Cl. ...................... 428/212; 428/515; 428/516; 428/520; 428/910
(58) Field of Search ................................ 428/910, 515, 428/516, 520, 34.9, 212

(56) References Cited

U.S. PATENT DOCUMENTS

| 4,148,972 A | * | 4/1979 | Yamane et al. | 428/515 |
| 4,923,722 A | * | 5/1990 | Kondo et al. | 428/34.9 |
| 5,350,471 A | * | 9/1994 | Planeta | 156/156 |
| 6,004,682 A | * | 12/1999 | Rackovan et al. | 428/518 |
| 6,074,715 A | * | 6/2000 | Lind et al. | 428/35.4 |
| 6,136,439 A | * | 10/2000 | Coburn | 428/409 |
| 2003/0157355 A1 | * | 8/2003 | Wallace et al. | 428/515 |

FOREIGN PATENT DOCUMENTS

| JP | 01-195043 | * | 8/1989 |
| JP | 04-1469231 | * | 6/1992 |

* cited by examiner

Primary Examiner—D. Lawrence Tarazano
(74) Attorney, Agent, or Firm—Peter F. Corless; Christine C. O'Day; Edwards & Angell, LLP

(57) ABSTRACT

A heat shrinkable multilayer film including a thermoplastic heat sealable inner layer, an abuse layer of a thermo-plastic polymer blend having a higher average melting point than said inner layer, and a thermoplastic, optically clear outer layer adjacent said abuse layer, wherein said outer layer has a lower Vicat softening point than said abuse layer. A film in accordance with the invention has high hot water seal strength, high burn-through resistance and superior optical properties without the need for irradiation.

53 Claims, No Drawings

MULTILAYER HEAT SHRINKABLE FILM

This invention relates to multilayer heat shrinkable film.

This invention has particular but not exclusive application to packaging for foods such as meat, poultry, and cheese and for illustrative purposes reference will be made to such application. However, it is to be understood that this invention could be used in other applications, such as packaging for curable putties and sealants, other foodstuffs such as tofu and the like.

Heat shrinkable films for perishables, such as meat, generally have a heat sealable inner layer and an outer abuse layer. The inner and outer layers are generally composed of the same resin, since resins of different melting points generally do not have the same shrinkage. This is to ensure that the shrink of the inner and outer layer is balanced. If the shrink of the inner and outer layers is not balanced, during the biorientation step, the secondary bubble is not stable and the film tends to curl inward or outward. In other words, if a high shrinkage resin in the inner layer is combined with a low shrink outer layer, or vice versa, the resultant film will curl or roll up and will not be able to be fabricated into bags.

In these types of films, the composition of the outer layer is chosen to be the same as the inner layer in order to achieve adequate seal strength and to prevent curl. However, an abuse outer layer having the same composition as the inner layer, leads to problems of burn-through and the need for irradiation. When heat sealing a film to make a bag, the seal area often becomes extruded during sealing. This elongation of the product results in thinning of the film and in an extreme situation severing of the thinned film. This is known as burn-through. One solution to this burn-through problem is to irradiate the film prior to manufacture of the bag.

Irradiation of a multilayer film causes the polymers in the film to cross-link. However, not all cross-linked thermoplastic films are easy to melt, which causes a reduction in heat sealability at conventional temperatures, pressures and times when using typical heat sealing equipment, thereby resulting in seals in bags made from the film. The equipment to irradiate the film is also highly expensive, costly to operate, increases the product cost, and usually requires an added step in the production operation.

International Publication No. WO00/32393 describes an attempt to overcome the problems of the above prior art films. There is disclosed a multilayer heat shrinkable film having an outer layer composed of a blend of thermoplastic polymers to provide a higher average melting point material than the inner layer, but having comparable shrink to prevent curling. The high melting point outer layer prevents burn-through. This allows a multilayer heat shrinkable film to be produced with excellent heat sealability while maintaining a high puncture resistant, high temperature outer layer to obtain a broad heat sealing range without the need to cross-link either the inner or outer layer. However, the film lacks the necessary clarity, gloss and haze requirements for a film for many products.

Accordingly, this invention in one aspect resides broadly in one aspect of the invention in a heat shrinkable multilayer film including:
a heat sealable inner layer of a thermoplastic polymer or a thermoplastic polymer blend;
an abuse layer of a thermoplastic polymer blend having a melting point at least about 20° C. higher than said inner layer, said abuse layer blend being selected to have substantially balanced shrinkage relative to said inner layer, and
a thermoplastic, optically clear outer layer adjacent said abuse layer, wherein said outer layer has a lower Vicat softening point as determined by ASTM D-1525 than said abuse layer.

The Vicat softening point (VSP) in accordance with the ASTM D-1525 is the temperature at which a flat ended needle of 1 $mm^2$ circular cross section will penetrate a thermoplastic specimen to a depth of 1 mm under a specified load and temperature. The test specimen is moulded or cut from a sheet with a specified minimum thickness and width. The specimen is placed on support bars and heated at a selected uniform rate of temperature rise. The needle is lowered so that it rests on the surface of the specimen. When the needle penetrates 1 mm the temperature is recorded, being the Vicat softening point. The data obtained from this test is useful in comparing the heat softening qualities of thermoplastic materials. Generally, thermoplastic products with a higher Vicat softening point tend to be harder to penetrate, whereas a lower Vicat softening point indicates a softer product.

Not being bound by theory, it is thought that films having an outer abuse layer with a higher melting point than the heat sealable inner layer, have less than desirable optical properties as the outer layer does not shrink as much as the inner layer. This may be so even if the inner and outer layers have compatible shrink such that the film does not curl. Since the outer layer is adhered to the inner layer, whether directly or via other layers of the film, it becomes wrinkled. This wrinkling causes the light to refract and makes the film appear hazy or white. When a softer material is added over the abuse layer it fills in the voids created by the wrinkles and allows the light to pass cleanly through the film. Since the light is not refracted the film appears clear.

The heat sealable inner layer may include very lower density polyethylene (VLDPE), linear low density polyethylene (LLDPE) ethylene vinyl acetate copolymer (EVA), ethylene α-olefin plastomer copolymer (plastomer) or a blend on two or more thereof. Suitably, the LLDPE is produced using metallocene single site catalysts.

Suitable polymer blends for the heat sealable layer may include:
a blend of VLDPE, EVA, and plastomer, and
a blend of LLDPE, EVA, and plastomer.

The polymer blend may have a melting point in the range of about 94° C. to 96° C. Each of the aforementioned three component blends may include between about 20% to about 33% of VLDPE or LLDPE, between about 33% to about 60% of EVA, and between about 15% to about 30% of plastomer of the total blend. The EVA may contain between about 3% and about 18% vinyl acetate based on the weight of the copolymer.

The heat sealing inner layer may include other suitable polymers and copolymers such as polypropylene, ethylene-propylene copolymer or an ionomer. It is to be understood, however, that the thermoplastic polymers mentioned herein are not intended to be an exhaustive list, but merely exemplary.

Thermoplastic polymers that are suitable for use in the abuse layer are recognized by those skilled in the art. The thermoplastic polymers may be selected to enable a broad heat sealing range while preventing burn-through during impulse heat sealing. Suitably polymers that may be included in the abuse layer are polypropylene (PP), polybutylene (PB), plastomer and EVA. Examples of suitable polymer blends for the abuse layer may include:
a blend of PP and PB,
a blend of PP, PB and EVA, and
a blend of PP, PB and plastomer.

The abuse layer polymer blend may have a melting point in the range of about 115° C. to 150° C., more suitably in range of about 123° C. to 136° C. The VSP of the abuse layer may be in greater than 115° C., more suitably about 119° C. to 120° C.

The abuse layer may include other thermoplastic materials, such as, for example, an ionomer, VLPDE, LLDPE or blends of these materials.

The optically clear outer layer may be a thermoplastic polymer or polymer blend. Suitable resins for use in the abuse layer may include PP, VLDPE, LLDPE, EVA, plastomer or suitable blends thereof. The LLDPE may be Ziegler-Natter catalyzed polymer. However, more suitably, the LLDPE is produced using metallocene single site catalysts.

Suitable polymers or polymer blends for the optically clear layer may include:
 a blend of PP and plastomer;
 a blend of VLDPE and plastomer;
 a blend of LLDPE and plastomer;
 a blend of VLDPE, EVA, and plastomer,
 a blend of LLDPE, EVA, and plastomer, and
 a blend of VLDPE, plastomer and PP.

As the VSP of PP can be relatively high, blends that include PP may include a substantially greater proportion of plastomer than PP. It is to be understood however that the thermoplastic polymers mentioned herein are not intended to be an exhaustive list, but merely exemplary. A person skilled in the art would be able to select a suitable polymer or polymer blend for the optically clear layer based on the composition of the abuse layer. In a preferred embodiment, the VSP of the optically clear layer may be less than about 111° C. and, suitably less than 100° C. In one embodiment, the VSP of the optically clear layer is less than about 80° C. and, suitably in the range of about 70° C. and about 80° C.

One or more thermoplastic layers may be included between the abuse layer and the inner layer. For example, if the multilayer heat shrinkable film requires barrier properties, the inner and abuse thermoplastic layers may be are adhered to opposite sides of an oxygen barrier layer. The barrier layer may include PVDC, polyamide barrier material such as nylon and hydrolyzed ethylene vinyl acetate copolymer (EVOH). For example, the barrier layer may include vinylidene chloride-vinyl chloride copolymer, vinylidene chloride-methyl acrylate copolymer or blends thereof.

The thickness of the barrier layer may be between about 0.1 mils and about 0.5 mils (2.5–12.5 $\mu$). Thinner barrier layers may not perform the intended functions and thicker layers do not appreciably improve performance.

The thickness of optically clear outer layer may be between about 0.2 mils and about 0.8 mils (5–20 $\mu$). Thinner layers may result in poorer optical properties while thicker layers do not contribute to an improved film.

The thickness of the abuse layer may be between about 0.5 mils and about 1.0 mils (12.5–25 $\mu$). Thinner layers may be less effective in performing the abuse resistance function, while thicker layers may reduce film stretchability.

The thickness of the heat sealable inner layer may be between about 0.4 mils to about 1.0 mils (10–25 $\mu$) to perform the previously described functions.

A four-layer film according to the invention which includes an oxygen barrier layer may have a total thickness of from about 1.6 mils to about 3.0 mils (40–75 $\mu$) and more suitably, from about 1.8 mils to about 3.0 mils (45–75 $\mu$). Lower thickness may reduce the effectiveness of at least one of the four layers while higher thickness may reduce the film flexibility and may not appreciably improve its performance.

While the embodiment of the invention including a barrier layer is specifically described in terms of four layers, it should be understood that one or more additional thermoplastic layers may be included in the multilayer film. For example, one or more additional thermoplastic layers may be included between the barrier layer and the abuse layer, between the barrier layer and the inner layer, or in place of the barrier layer. This additional layer may include for example EVA, LLDPE, VLDPE, polypropylene, EVOH, polyurethane, acrylonitrile nylon, ionomer, or blends thereof. In addition, various conventional additives such as slip agents and pigments can be incorporated in the film in accordance with conventional practice.

Though a film in accordance with the invention does not require irradiation, it is to be understood that the film could be produced with one or more layers cross-linked by irradiation to further broaden and/or increase the heat sealing range.

The multilayer film of this invention can be produced by known techniques such as by co-extruding the multiple layers into a primary tube, followed by biaxially stretching the tube by known techniques to form a heat shrinkable film. Alternatively, the film may be a slot cast co-extruded multilayer film, which is subsequently biaxially stretched. In a still further alternative, the film may made by coating lamination, followed by biaxially stretching.

The resulting film may shrink from about 20% to about 60% in at least one of machine and transverse directions by measuring unrestrained shrink of the film at 90° C. for about five seconds, or equivalent shrinkage thereof. In a preferred embodiment, the film shrinks at least 40% in at least one of machine and transverse directions.

The film of the present invention may be in the form of a flat sheet or a tubular article. Suitably, the film is formed into bags useful for packaging meat, poultry and cheese. The multilayer film is especially useful for those bags manufactured by hot bar, impulse sealing or a combination thereof.

In another aspect, this invention resides in a heat shrinkable multilayer film including:
 a heat sealable inner layer of a thermoplastic polymer blend having an average melting point of between about 94° C. to 96° C.;
 an abuse layer of a thermoplastic polymer blend having an average melting point of between about 120° C. to 150° C., said abuse layer blend being selected to have substantially balanced shrinkage relative to said inner layer, and
 a thermoplastic, optically clear outer layer adjacent said abuse layer, wherein said outer layer has a lower Vicat softening point as determined by ASTM D-1525 than said abuse layer.

The film may include an oxygen barrier core layer between the inner layer and the abuse layer. For example, the barrier layer may be PVDC. The inner, abuse and outer layers may include any suitable thermoplastic polymer or polymer blend as described above. The optically clear outer layer may have a VSP of less than about 111° C. In one embodiment, the optically clear outer layer has a VSP of less than about 80° C.

In another aspect, this invention resides in a heat shrinkable multilayer film including:
 a heat sealable inner layer of a polymer blend of VLDPE, EVA and plastomer;
 an abuse layer of a polymer blend PP, PB and EVA or plastomer, said abuse layer blend being selected to have substantially balanced shrinkage relative to said inner layer, and an optically clear outer layer adjacent said abuse layer of a polymer blend of EVA, VLDPE and PP.

The film may include an oxygen barrier core layer between the inner layer and the abuse layer. For example, the barrier layer may be PVDC. The inner, abuse and outer layers may include any suitable thermoplastic polymer or polymer blend as described above. The optically clear outer layer may have a VSP of less than about 111° C. In one embodiment, the optically clear outer layer has a VSP of less than about 80° C.

In order that this invention may be more readily understood and put into practical effect, reference will now be made to the following examples which illustrate preferred embodiments of the invention.

As used herein, the term "polymer" refers to the product of a polymerization reaction, and is inclusive of homopolymers, copolymers, terpolymers, etc.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerisation reaction product of ethylene and an α-olefin, such as 1-hexene. However, the term "copolymer" is also inclusive of, for example, the copolymerisation of a mixture of ethylene, propylene, 1-hexene, and 1-octene.

As used herein, the phrase "ethylene α-olefin copolymer" refer to such heterogeneous materials as linear low density polyethylene (LLDPE), and very low and ultra low density polyethylene (VLDPE and ULDPE); and homogeneous polymers such as metallocene catalyzed polymers such as EXACT™ materials supplied by Exxon, and TAFMER™ materials supplied by Mitsui Petrochemical Corporation. These materials generally include copolymers of ethylene with one or more comonomers selected from $C_3$ to $C_{10}$ α-olefins such as propene, butene-1, hexene-1, octene-1, etc in which the molecules of the copolymers comprise long chains with relatively few side chain branches or cross-linked structures. Other ethylene α-olefin copolymers, are available from the Dow Chemical Company, known as ENGAGE™, AFFFINITY™ and ATTANE™ resins, are also included as another type of ethylene α-olefin copolymer useful in the present invention.

As used herein, the term "ethylene vinyl acetate copolymer" or "EVA" is used to refer to a copolymer formed from ethylene and vinyl acetate monomers wherein the ethylene derived units in the copolymers are present in major amounts, preferably between about 60% and 98% by weight and the vinyl acetate derived units in the copolymer are present in minor amounts, preferably between about 2% and 40% by weight.

As used herein, a "plastomer" is a low molecular weight ethylene α-olefin copolymer which has properties generally intermediate to those of thermoplastic materials and elastomeric materials. Typically, plastomers have an ethylene crystallinity between LLDPE and VLDPE and ethylene α-olefin elastomers. The plastomers used in this invention comprise copolymers of ethylene and at least one $C_3$–$C_{10}$ α-olefin. Illustrative non-limiting examples of suitable copolymers are those such as ethylene butene-1, ethylene hexene-1, ethylene octene-1, and ethylene propylene copolymers.

As used herein, the term "polypropylene" refers to any polymer comprising propylene polymerization units, regardless of whether the polymer is a homopolymer or a copolymer, and further includes blends of such homopolymers and copolymers.

As used herein, the term "polybutylene" refers to any polymer comprising butene-1 polymerization units, regardless of whether the polymer is a homopolymer or a copolymer, and further includes blends of such homopolymers and copolymers. These materials generally include copolymers of butene-1 with or without α-olefins monomers, such as butene-1-ethylene, butene-1-propylene, and butene-1-α-olefins having from 5 to 8 carbon atoms.

As used herein, the term "polyvinylidene chloride" or "PVDC" refers to a vinylidene chloride copolymer wherein a major amount of the copolymer comprises vinylidene chloride and a minor amount of the copolymer comprises one or more unsaturated monomers copolymerizable therewith, typically vinyl chloride, and alkyl acrylates (e.g. methyl acrylate) or to a blend thereof in different proportions. Generally, PVDC will contain plasticisers and/or stabilizers as known in the art.

As used herein, the phrase "outer layer" refers to the outermost layer of the film which in the end package will be in contact with the environment.

As used herein, the phrase "heat sealable" means that the inner layer is capable of fusion bonding by conventional indirect heating means which generate sufficient heat on at least one film contact surface for conduction to the contiguous film contact surface and formation of a bond interface between without loss of the film integrity. The bond interface should be sufficiently thermally stable to prevent gas or liquid leakage when exposed to above or below ambient temperatures during processing of food within the tube when sealed at both ends, i.e., in bag form. Further, the bond interface between contiguous inner layers must have sufficient physical strength to withstand the tension resulting from stretching or shrinking due to the food body sealed within the tube.

As used herein, the phrase "abuse layer" means a film layer which resists abrasion, puncture, and other potential causes of reduction of package integrity relative to the other layers of the film.

As used herein the term "barrier layer" means oxygen barrier layer unless otherwise specified. The barrier layer may serve to inhibit transmission of oxygen and water vapor. The functional requirement of the barrier layer, together with the other layers, may provide an oxygen transmission rate through the entire multilayer cook-in film below about 20 cc/1 $m^2$/24 hrs/atm. This may avoid spoilage of certain food products, for example meat enclosed in the multilayer film package due to oxygen passage from the environment through the film wall.

As used herein, the term "substantially balanced shrinkage" means that the inner and abuse layers are compatible in shrink such that the composite structure of the film does not curl either inward or outward. It is to be understood that the shrinkage of each separate inner and abuse removed from the composite structure of the film is not to be considered when determining when a film has substantially balanced shrinkage.

As used herein, the term "melting point" means average melting point when referring to a polymer blend. It is calculated by averaging the melting points of the thermoplastic polymers in the blend taking into account the proportion of each polymer in the blend.

As used herein, the term "heat-shrinkable" refers to a film which shrinks by at least 15% of its original dimensions, in at least one of the machine and transverse directions, when heated to 90° C. for at least four seconds.

In a preferred embodiment, a heat shrinkable multilayer film was produced having:
  a) a heat sealable inner layer of a blend of VLDPE or LLDPE and EVA and plastomer having a melting point of about 96° C.;
  b) a barrier core layer of PVDC;
  c) an abuse layer of a blend of PB, PP, and a plastomer or EVA having a melting point of between about 123° C. to about 136° C.;

d) an optically clear outer layer of a thermoplastic polymer blend adjacent said abuse layer and selected to have VSP less than 111° C.

In various embodiments of the invention, the outer layer was selected from the following:

a blend of EVA, VLDPE and a plastomer having a melting point of about 96° C.;

a blend of EVA, LLDPE and a plastomer having a melting point of about 96° C.;

a blend of VLDPE and a plastomer having a melting point of about 98° C.;

a blend of LLDPE and a plastomer having a melting point of about 98° C.; and a blend of a PP and a plastomer having a melting point of about 83° C.

a blend of VLDPE, plastomer and PP having a melting point of about 101.7° C.

A preferred blend of polymers suitable for the optically clear outer layer, which is not listed in Table C, is composed of:

a) An ethylene α-olefin plastomer copolymer having a melting point of 74° C., a density of 0.885 gm/cm$^3$, a melt index of 1.0 g/10 min, and VSP of 57° C. The plastomer comprises about 45 wt % of the total blend of the outer layer.

b) A VLDPE comprising about 44 wt %, of the total blend of the outer layer. It is an ethylene-octene copolymer having a melting point of 122° C., a density of 0.912 gm/cm$^3$, a melt index of 1.0 g/10 min, and a VSP of 92° C.

c) A polypropylene having a melting point of 135° C., a density of 0.89 gm/cm$^3$ and a melt index of 5.5 g/10 min comprising about 10 wt % of the total blend of the outer layer.

d) Processing aid comprising about 1 wt % of the total blend of the outer layer.

The heat sealable inner layer includes at least 33% to about 60% of EVA, at least 20% to about 33% of VLDPE or LLDPE, and at least 15% to about 30% of plastomer based on the total blend of the inner layer. The EVA may contain between about 3% and about 18% vinyl acetate based on the weight of the copolymer.

The thickness of optically clear outer layer is between 0.2 mils and 0.8 mils. The thickness of the abuse layer is between about 0.5 mils and 1.0 mils. The thickness of the barrier layer is between 0.1 mils to 0.5 mils. The thickness of the heat sealable inner layer is between about 0.4 mils to about 1.0 mils. The four-layer film has a total thickness of from about 1.6 mils to about 3.0 mils, more suitably from about 1.8 mils to about 3.0 mils.

In general, various conventional additives such as slip agents and pigments were incorporated in the films in accordance with conventional practice.

The multilayer film of this invention can be produced by known techniques such as by co-extruding the multiple layers into a primary tube, followed by biaxially stretching the tube by known techniques to form a heat shrinkable film. The "double bubble" technique disclosed in Pahlke U.S. Pat. No. 3,456,044 can be used to produce the film of this invention. Alternatively, the film may be a slot cast co-extruded multilayer film, which is subsequently biaxially stretched. In a still further alternative, coating lamination may be used to for the multilayer film. For example, a first inner tubular layer may be extruded and thereafter the barrier, abuse, and outer tubular layers are sequentially coated onto the inner to form the composite primary tube, which may be biaxially stretched. Coating lamination procedures are described in Brax et al. U.S. Pat. No. 3,741,253.

If the film of this invention is produced in a tubular stock, bags can be produced by hot bar sealing one end of a length of the tubular film or at any number of longitudinally spaced positions across the tube width, and then cutting the tube or splitting one edge to form the bag mouth. If the film of this invention is made in the form of flat sheets, bags can be formed by hot bar sealing three edges of two superimposed sheets of film. When carrying out the hot bar sealing operations, the surfaces that are heat sealed to each other to form seams are the inner heat sealable layers of the multilayer films of the invention. The inner layer forms the inside portion of the bag while the outer layer forms the outside portion of the bag. The mouth of the bag may be sealed by impulse heat sealing after filling. Once food is inserted into the bag, the package is evacuated and the bag mouth sealed, generally by impulse heat sealing techniques.

EXAMPLE 1

In a series of tests, 4-layer films including a heat sealable inner layer, a vinylidene chloride copolymer type oxygen barrier core layer, an abuse layer and an optically clear outer layer. The 4-layer film was the biaxially oriented heat shrinkable type, prepared by the double or trapped bubble method as broadly described in the aforementioned Palkhe U.S. Pat. No. 3,456,044. In particular, all four layers were simultaneously coextruded.

Certain physical properties of bags were measured by either of the test procedures discussed below.

Shrinkage values were obtained by measuring unrestrained shrink of the stretched film at 90° C. for five seconds. Four test specimens were cut from a given sample of the oriented film to be tested. The specimens were cut to 10 cm in the machine direction by 10 cm in the transverse direction. Each specimen was completely immersed for 5 seconds in a 90° C. water bath. The distance between the ends of the shrunken specimen was measured. The difference in the measured distance for the shrunken specimen and the original 10 cm was multiplied by ten to obtain the percent of shrinkage for the specimen. The shrinkage for the four specimens was averaged for the MD shrinkage values of the given film sample, and the shrinkage for the four specimens was averaged for the TD shrinkage value.

The two layers on each side of the barrier layer were separated from the barrier layer by immersing the five layer film in a bath of glycerine for a period of several hours. The shrink of the separated layers was measured as described above.

The impulse sealing range test is run to determine and compare the acceptable voltage ranges for impulse sealing plastic films. An evacuator impulse sealer used by the meat industry to evacuate and seal products placed into the bags was used. Boss Vacuum Packaging Machines manufacture this evacuator sealer. This evacuator sealer is equipped with impulse sealing ribbons covered by a Teflon cloth. A constant voltage is applied to the sealing ribbons and is not adjustable. (This is typical for evacuator sealers used commercially by the industry.) The time that the voltage is applied to the sealing ribbons is adjustable to control the sealing time to obtain a leak proof strong seal. The time is adjustable from 0 to 4.0 seconds or from 0 to 10 on the indicator on the machine.

Film samples are placed in the evacuator sealer and the sealing time is adjusted to determine the minimum time that is required to obtain a strong seal and the maximum time that a good seal can be obtained without burn through.

The results of these tests are summarized in Table A. Table B lists the average melting points of the resin blends used in the inner, abuse and outer layers. The average melting point of the various blends is calculated taking into account the percentage of each polymer in the specified blend. The fraction of each polymer in the blend is multiplied by its melting point and the sum of these values is the melting point of the blend. Table C defines the inner, abuse and outer formulations. Table D defines the individual resins that were used in the blends.

The tables use the following nomenclature:

| | |
|---|---|
| Inner | The heat sealing inner layer. |
| PVDC | The oxygen barrier core layer. |
| Abuse | The abuse layer. |
| Outer | The optically clear outer layer. |

TABLE A

| | Formulation % | | | | Shrink % MD/TD | | | | Color After Shrink | Seal Range |
|---|---|---|---|---|---|---|---|---|---|---|
| Test | Inner | PVDC | Abuse | Outer | Inner | Abuse/Outer* | Film | Haze/Gloss | | |
| 1** | IC/60 | 11 | 0 | OD/29 | 60/56 | 20/26 | 46/43 | 10/76 | Very Hazy | 3–5 |
| 2 | 1C/60 | 11 | ATC/9 | OC/20 | 51/52 | 51/52 | 54/53 | 8/91 | Clear | 3–3.5 |
| 3 | IC/60 | 11 | ATD/9 | OD/20 | 53/55 | 12/27 | 49/52 | 13/75 | White | 3–5 |
| 4 | IC/60 | 11 | ATD/9 | OE/20 | 55/56 | 13/42 | 52/55 | 17/61 | White | 3–5 |
| 5 | IC/60 | 11 | ATD/9 | OF/20 | 56/57 | 18/48 | 50/57 | 18/57 | White | 3–5 |
| 6 | IC/60 | 11 | ATG/20 | OC/9 | 54/53 | 28/41 | 47/49 | 8/88 | Clear | 3–4 |
| 7 | IC/60 | 11 | ATH/20 | OC/9 | 53/54 | 26/35 | 44/47 | 9/86 | Clear | 3–4.5 |
| 8 | IC/60 | 11 | ATH/20 | OL/9 | 57/57 | 30/38 | 48/50 | 9/89 | Clear | 3–4.5 |
| 9 | IC/60 | 11 | ATH/20 | ON/9 | 50/52 | 23/37 | 47/49 | 9/83 | Clear | 3–5 |
| 10 | IC/60 | 11 | ATH/20 | OO/9 | 59/57 | 37/41 | 54/52 | 8/93 | Clear | 3–5 |
| 11 | IC/60 | 11 | ATH/20 | OP/9 | 59/58 | 24/29 | 48/47 | 15/86 | Clear*** | 3–5.5 |
| 12 | IC/60 | 11 | ATH/20 | OQ/9 | 54/55 | 36/39 | 51/52 | 11/87 | Clear | 3–4.5 |
| 13 | IC/60 | 11 | ATH/20 | OE/9 | 51/54 | 27/35 | 49/50 | 18/64 | Hazy | 3–5.0 |
| 14 | IC/60 | 11 | ATH/20 | OD/9 | 50/53 | 24/36 | 52/53 | 13/76 | Hazy | 3–5.0 |
| 15 | ID/60 | 11 | ATH/20 | OR/9 | 57/58 | 37/41 | 54/53 | 11/79 | Clear | 3–5.0 |

*The abuse layer and the optically clear outer layer could not be separated.
**Current commercial three-layer product.
***The film was clear but the surface was rough in texture.

TABLE B

| | INNER | | | ABUSE | | | OUTER | | | ABUSE & OUTER |
|---|---|---|---|---|---|---|---|---|---|---|
| TEST | Form | Gauge μ | Melt Pt °C. | Form | Gauge μ | Melt Pt °C. | Form | Gauge μ | Melt Pt °C. | Ave Melt Pt °C. |
| 1 | IC | 1 | 96 | | | | OD | 1 | 135 | — |
| 2 | IC | 0.6 | 96 | ATC | 0.09 | 96 | OC | 0.2 | 96 | 96 |
| 3 | IC | 0.6 | 96 | ATD | 0.09 | 87 | OD | 0.2 | 128 | 115 |
| 4 | IC | 0.6 | 96 | ATD | 0.09 | 87 | OE | 0.2 | 111 | 104 |
| 5 | IC | 0.6 | 96 | ATD | 0.09 | 87 | OF | 0.2 | 101 | 97 |
| 6 | IC | 0.6 | 96 | ATG | 0.2 | 124 | OC | 0.09 | 96 | 115 |
| 7 | IC | 0.6 | 96 | ATH | 0.2 | 135 | OC | 0.09 | 96 | 123 |
| 8 | IC | 0.6 | 96 | ATH | 0.2 | 135 | OL | 0.09 | 96 | 123 |
| 9 | IC | 0.6 | 96 | ATH | 0.2 | 135 | ON | 0.09 | 98 | 124 |
| 10 | IC | 0.6 | 96 | ATH | 0.2 | 135 | OO | 0.09 | 98 | 124 |
| 11 | IC | 0.6 | 96 | ATH | 0.2 | 135 | OP | 0.09 | 135 | 131 |
| 12 | IC | 0.6 | 96 | ATH | 0.2 | 135 | OQ | 0.09 | 83 | 112 |
| 13 | IC | 0.6 | 96 | ATH | 0.2 | 135 | OE | 0.09 | 111 | 124 |
| 14 | IC | 0.6 | 96 | ATH | 0.2 | 135 | OD | 0.09 | 128 | 133 |
| 15 | ID | 0.6 | 96 | ATH | 0.2 | 135 | OR | 0.09 | 83 | 112 |

TABLE C

| Layer | Formulation | Average Melting Point °C. | VSP °C.* |
|---|---|---|---|
| Inner | | | |
| IC | 10% 1005 VN2, 24% 1003 VN4, 35% VP 8770, 30% SL 4100, 1% PA | 96 | 79.2 |
| ID | 10% 1005 VN2, 24% 1003 VN4, 35% VP 8770, 30% Elite 5400, 1% PA | 96 | |
| Abuse | | | |
| ATC | 10% 1005 VN2, 24% 1003 VN4, 35% VP 8770, 30% SL 4100, 1% PA | 96 | 79.2 |
| ATD | 100% Bynel 3101 | 87 | |
| ATG | 45% APRYLL 3020GN23, 44% 8640, 10% 3101 | 124 | |
| ATH | 45% KF 211 SB, 44% 8640, 10% 3101 | 135 | 119.9 |
| Outer | | | |
| OC | 10% 1005 VN2, 24% 1003 VN4, 35% VP 8770, 30% SL 4100, 1% PA | 96 | 79.2 |
| OD | 45% KF 211 SB, 30% 8640, 24% 8770, 1% PA | 128 | |
| OE | 40% KF 211 SB, 59% VP 8770, 1% PA | 111 | |
| OF | 40% APRYLL 3020GN23, 59% VP 8770, 1% PA | 101 | |
| OL | 10% 1005 VN2, 24% 1003 VN4, 35% VP 8770, 30% 5056, 1% PA | 96 | |
| ON | 50% 5056, 50% VP 8770 | 98 | |
| OO | 50% SL 4100, 50% VP 8770 | 98 | 78.7 |
| OP | 100% Adsyl | 135 | 110.8 |
| OQ | 10% KF 211 SB, 89% VP 8770, 1% PA | 83 | 71.5 |
| OR | 10% 1005 VN2, 24% 1003 VN4, 35% VP 8770 30% Elite 5400, 1% PA | 96 | |

*The Vicat softening point is the softening point of the blends of the resins.

TABLE D

| Resin | Manufacturer | Polymer Type | Melt Index g/10 min | Density g/cm³ | Melting Point °C. | VSP °C. |
|---|---|---|---|---|---|---|
| VN1003 VN4 | ATO Evatane 13.5% VA | EVA | 0.35 | 0.935 | 93 | 73 |
| VN1005 VN2 | ATO Evatane 5% VA | EVA | 0.40 | 0.928 | 102 | 83 |
| SL 4100 | Dow Attane | VLDPE | 1.00 | 0.912 | 122 | 92 |
| VP 8770 | Dow Affinity | Plastomer | 1.0 | 0.885 | 74 | 57 |
| 8640 | Shell PB | PB Polybutylene | 1.0 | 0.908 | 116 | 113 |
| 3101 | DuPont Bynel | EVA Tie Polymer | 3.5 | 0.943 | 87 | 65 |
| 5056 | Dow Dowlex | LLDPE | 1.1 | 0.919 | 122 | 104.5 |
| PA | Ampacet 100031 | Processing Aid | 2.0 | 0.94 | 122 | |
| KF 211 SB | Borealis Daplen PP | PP Polypropylene | 8.0 | 0.90 | 165 | 152 |
| APRYLL 3020GN23 | ATO | PP Polypropylene | 1.8 | 0.90 | 148 | |
| Adsyl 5 C 37 | Montell | PP Polypropylene | 5.5 | 0.89 | 135 | 110.8 |
| Elite 5400 | Dow | LLDPE metallocene | 1.0 | 0.916 | 122 | 92 |

Discussion of Test Results

Test 1 is the current commercial three-layer manufactured according to the description of International Publication No. WO00/32393. As shown in Table A, this film has a higher heat sealing range of 3–5 when compared to a typical non-cross linked film in test 2 that has a heat sealing range of 3–3.5.

While the film of test 1 is a commercially accepted product, it does not have as high a clarity and glossy appearance as the film of test 2. This is indicated by the higher haze and lower gloss values as compared to test 2. In addition, after shrinking the film becomes very hazy as compared the film of test 2. This is shown in table A.

Test 2 consists of a heat shrinkable, non-crosslinked film that is a typical construction used in the industry. The melting temperature of the inner and outer layer is the same, having the same formulation. While the seal strength of this film meets the requirements for the products the seal range is very narrow as shown in table A.

Tests 6 through to 12 and 15 demonstrate films of this invention where the material of the optically clear outer layer has a lower VSP than the material of the abuse layer. It is predicted that the VSP of each of the optically clear outer layers is less than 111° C. Surprisingly, the optical properties of the films are improved and the films remain clear after shrinking. The heat sealing range is also improved as compared the conventional film of test 2.

While the heat sealing range of the films of test 6, 7, and 8 are not as broad as the films of test 1, increasing the proportion of LLDPE 5056 or VLDPE 4100 in the outer layer blend, as in tests 9 or 10, improves the heat sealing range to be equal to that of test 1.

Tests 3, 4, 5, 13 and 14 demonstrate that if the optically clear outer layer consists of materials with a VSP greater than the abuse layer the optical properties are not improved.

In test 11 a polypropylene with a low VSP comprised the optically clear outer layer. Even though the polypropylene has a high melting point as compared to the other tests because it had a low VSP as compared to the polypropylene used in the abuse layer the film remained clear after shrinking. The film is not deemed acceptable for commercial use because the surface of the film was rough. This may be due to the low shrink of the outer layer as indicated by the combined shrink of the abuse and outer layer.

A multilayer film in accordance with the invention has high hot water seal strength, high burn-through resistance, a broad impulse sealing range, enhanced puncture resistance and superior optical properties without the added step to cross-link the film with irradiation.

It will of course be realised that while the foregoing has been given by way of illustrative example of this invention, all such and other modifications and variations thereto as would be apparent to persons skilled in the art are deemed to fall within the broad scope and ambit of this invention as is herein set forth.

What is claimed is:

1. A heat shrinkable multilayer film including:
    a heat sealable inner layer of a thermoplastic polymer or a thermoplastic polymer blend;
    an abuse layer of a thermoplastic polymer blend having a melting point at least about 20° C. higher than said inner layer, said abuse layer blend being selected to have substantially balanced shrinkage relative to said inner layer, and
    a thermoplastic, optically clear outer layer adjacent said abuse layer, wherein said outer layer has a lower Vicat softening point as determined by ASTM D-1525 than said abuse layer.

2. A film according to claim 1 wherein said inner layer includes very lower density polyethylene, linear low density polyethylene, ethylene vinyl acetate copolymer, ethylene α-olefin plastomer copolymer, or a blend of two or more thereof.

3. A film according to claim 2 wherein said linear low density polyethylene is a metallocene single site catalyzed copolymer.

4. A film according to any one claim 1 wherein said inner layer includes a polymer blend of very lower density polyethylene, ethylene vinyl acetate copolymer, and ethylene α-olefin plastomer copolymer.

5. A film according to claim 1 wherein said inner layer includes a polymer blend of linear low density polyethylene, ethylene vinyl acetate copolymer, and ethylene α-olefin plastomer copolymer.

6. A film according to claim 5 wherein said linear low density polyethylene is a metallocene single site catalyzed copolymer.

7. A film according to claim 4 wherein the polymer blend has an average melting point of 94° C. to 96° C.

8. A film according to claim 5 wherein the polymer blend has an average melting point of 94° C. to 96° C.

9. A film according to claim 1 wherein said inner layer is polymer blend including between 20% to 33% of very lower density polyethylene or linear low density polyethylene, between 33% to 60% of ethylene vinyl acetate copolymer, and between 15% to 30% of ethylene α-olefin plastomer copolymer based on the weight of the said polymer blend.

10. A film according to claim 1 wherein said abuse layer includes a polymer blend of two or more of polypropylene, polybutylene, ethylene α-olefin plastomer copolymer and ethylene vinyl acetate copolymer.

11. A film according to claim 1 wherein said abuse layer includes a polymer blend of polypropylene and polybutylene.

12. A film according to claim 1 wherein said abuse layer includes a polymer blend of polypropylene, polybutylene and ethylene vinyl acetate copolymer.

13. A film according to claim 1 wherein said abuse layer includes a polymer blend of polypropylene, polybutylene and ethylene α-olefin plastomer copolymer.

14. A film according to claim 10, wherein said abuse layer polymer blend has an average melting point is in the range of 115° C. to 150° C.

15. A film according to claim 14 wherein said average melting point is in range of 123° C. to 136° C.

16. A film according to claim 1 wherein the Vicat softening point of the polymer blend of the abuse layer is greater than about 115° C.

17. A film according to claim 1 wherein said Vicat softening point is in the range of 119° C. to 120° C.

18. A film according to claim 12 wherein said Vicat softening point is in the range of 119° C. to 120° C.

19. A film according to claim 1 wherein said outer layer includes polypropylene, very lower density polyethylene, linear low densely polyethylene, ethylene vinyl acetate copolymer, ethylene α-olefin plastomer copolymer or a blend of two or more thereof.

20. A film according to claim 19 wherein said linear low density polyethylene is a metallocene single site catalyzed copolymer.

21. A film according to claim 1 wherein said outer layer includes a polymer blend of polypropylene and ethylene α-olefin plastomer copolymer.

22. A film according to claim 1 wherein said outer layer includes a polymer blend of very lower density polyethylene, ethylene α-olefin plastomer copolymer and polypropylene.

23. A film according to claim 1 wherein said outer layer includes a polymer blend of very lower density polyethylene and ethylene α-olefin plastomer copolymer.

24. A film according to claim 1 wherein said outer layer includes a polymer blend of linear low density polyethylene and ethylene α-olefin plastomer copolymer.

25. A film according to claim 1 wherein said outer layer includes a polymer blend of very lower density polyethylene, ethylene vinyl acetate copolymer, and ethylene α-olefin plastomer copolymer.

26. A film according to claim 1 wherein said outer layer includes a polymer blend of linear low density polyethylene, ethylene vinyl acetate copolymer, and ethylene α-olefin plastomer copolymer.

27. A film according to claim 21, wherein the proportion of ethylene α-olefin plastomer copolymer in said polymer blend is greater than the proportion of polypropylene.

28. A film according to claim 23 wherein the proportion of ethylene α-olefin plastomer copolymer in said polymer blend is greater than the proportion of polypropylene.

29. A film according to claim 1 wherein said outer layer has a Vicat softening point less than about 111° C.

30. A film according to claim 29 wherein said Vicat softening point is less than about 100° C.

31. A film according to claim 30 wherein said Vicat softening point is in the range of 70° C. and 80° C.

32. A film according to claim 16 wherein the Vicat softening point of the outer layer is less than about i 111° C.

33. A film according to claim 1 wherein said film includes one or more thermoplastic layers between the abuse layer and the inner layer.

34. A film according to 33 wherein said one or more thermoplastic layers is an oxygen barrier layer.

35. A film according to claim 34 wherein said barrier layer includes polyvinylidene chloride, a polyamide barrier material or hydrolyzed ethylene vinyl acetate copolymer.

36. A film according to claim 34 wherein said barrier layer includes vinylidene chloride-vinyl chloride copolymer or vinylidene chloride-methyl acrylate copolymer or a blend thereof.

37. A film according claim 1 wherein the thickness of said outer layer is in the range of 5 $\mu$ to 20 $\mu$.

38. A film according to claim 1 wherein the thickness of said abuse layer is in the range of 12.5 $\mu$ to 25 $\mu$, the thickness of the said inner layer is in the range of 10 $\mu$ to 25 $\mu$ and the thickness of said barrier layer is in the range of 2.5 $\mu$ to 12.5 $\mu$.

39. A film according to claim 1 wherein said film is a tubular multilayer film formed by coextrusion or coating lamination.

40. A film according to claim 1 wherein said film shrinks al least 40% in at least one of machine and transverse 41. A bag formed from a film of claim 1.

42. A heat shrinkable multilayer film comprising:
- a heat sealable inner layer of a thermoplastic polymer blend having an average melting point between 94° C. to 96° C.;
- an abuse layer of a thermoplastic polymer blend having an average melting point between 120° C. to 150° C., said abuse layer blend being selected to have substantially balanced shrinkage relative to said inner layer, and
- a thermoplastic, optically clear outer layer adjacent said abuse layer, wherein said outer layer has a lower Vicat softening point as determined by ASTM D-1525 than said abuse layer.

43. A film according to claim 42 wherein said film includes an oxygen barrier core layer between said inner layer and said abuse layer.

44. A film according to claim 43 wherein said barrier layer is a polyvinylidene chloride.

45. A film according to claim 42 wherein the Vicat softening point of said outer layer is less than about 111° C.

46. A film according to claim 45 wherein said Vicat softening point is in the range of 70° C. to 80° C.

47. A film according to claim 45 wherein the Vicat softening point of said abuse layer is greater than 115° C.

48. A heat shrinkable multilayer film comprising:
- a heat sealable inner layer of a polymer blend of very lower density polyethylene, ethylene vinyl acetate copolymer, and ethylene α-olefin plastomer copolymer;
- an abuse layer of a polymer blend of polypropylene, polybutylene and ethylene vinyl acetate copolymer or ethylene α-olefin plastomer copolymer, said abuse layer blend being selected to have substantially balanced shrinkage relative to said inner layer;
- an optically clear outer layer adjacent said abuse layer of a polymer blend of ethylene vinyl acetate copolymer, very lower density polyethylene and polypropylene.

49. A film according to claim 48 wherein said film includes an oxygen barrier core layer between said inner layer and said abuse layer.

50. A film according to claim 49 wherein said barrier layer is polyvinylidene chloride.

51. A film according to claim 48 wherein the Vicat softening point of said outer layer is less than about 111° C.

52. A film according to claim 51 wherein said Vicat softening point is in the range of 70° C. to 80° C.

53. A film according to claim 51 wherein the Vicat softening point of said abuse layer is greater than 115° C.

* * * * *